Patented Feb. 6, 1923.

1,444,527

UNITED STATES PATENT OFFICE.

CHARLES A. SCHARSCHU, OF PITTSFIELD, MASSACHUSETTS, ASSIGNOR TO GENERAL ELECTRIC COMPANY, A CORPORATION OF NEW YORK.

FURNACE REFRACTORY.

No Drawing.   Application filed July 15, 1921.   Serial No. 485,079.

*To all whom it may concern:*

Be it known that I, CHARLES A. SCHARSCHU, a citizen of the United States, residing at Pittsfield, county of Berkshire, State of Massachusetts, have invented certain new and useful Improvements in Furnace Refractories, of which the following is a specification.

The present case is a part continuation of my application filed June 27, 1919, Serial Number 307,238, renewed April 19, 1921, Serial Number 462,644.

The present invention comprises a new refractory which is suitable for general use in furnaces, and particularly as a lining for electric furnaces operated at very high temperatures.

It is the object of my invention to produce a lining operable at high temperatures without cracking. I have found that this result may be obtained by constituting the lining of a mixture of suitable refractory materials, one of which expands when being brought to the operating temperature and another which contracts when being brought to the operating temperature together with a suitable binder, which preferably disappears at operating temperatures without affecting the refractoriness of the lining.

Furnace linings used heretofore consisting of calcined or dead burned magnesite and various binders contract when brought up to high temperatures. This contraction frequently causes cracks in the lining which permits some of the molten charge to run through and damage parts of the furnace. The shrinkage in the lining probably is due to both the contraction of the particles of material and also due to the evolution of substances such as water and carbon dioxide which have combined with the lining material at ordinary temperatures. Even when the lining did not immediately crack when brought up to a high temperature in the furnace, its life was very short even under the best conditions, allowing the furnace to be operated with but a few heats before the deterioration of the lining required a shutdown of the furnace and a replacement of the lining material.

It has been suggested to make furnace linings of magnesia which has been melted, crystallized and finally ground to suitable size and applied with a binder. Such a lining tends to expand and crack when heated. It has also been suggested in accordance with German Patent 225,472 to produce refractory bodies from a mixture of fused and sintered magnesia formed or shaped by the addition of water only. I have found that greatly superior results are obtained by the addition of a non-fluxing binder which disappears either by dissociation or oxidation and is replaced by sublimed magnesia in the surface layers under operating conditions and temperatures.

In preparing a furnace refractory in accordance with my invention, pure refractory magnesium oxide which has been fused in any suitable way, for example in an electric arc, is crushed to a size depending upon the article to be made and the conditions under which it is to be used. For example, when preparing a lining for an electric furnace for steel making of commercial sizes, the fused magnesium oxide is crushed to grains varying from $\frac{1}{8}''$ diameter to one inch diameter, a mixture including the larger sized particles being preferable for the larger furnaces, say furnaces of 20 tons capacity. The crushed material is mixed with a suitable non-fluxing binder, for example, a binder which at high temperature will decompose yielding magnesium oxide by decomposition. The proportion of the binder to the prefused magnesium oxide should be chosen so as to make a mixture which has sufficient binding power to maintain a desired shape. I may use about 5% by weight of a binder of magnesium compound, such as magnesium sulphate or magnesium chloride which will decompose leaving magnesium oxide. I have obtained excellent results when using a carbonizable, adhesive material, such as tar, as a binder. In some cases a refractory cement having a lower sintering temperature than the lining material itself or a small proportion of an iron compound such as ferrous sulphate may be used as a binder.

To this mixture is added calcined magnesium oxide, that is magnesium oxide which has not been heated up to the temperature of fusion which is produced by heating magnesium carbonate, magnesium hydrate or other magnesium compound to the temperature of decomposition; for example to 700 degrees C. This material which has a specific gravity of 3 or about 3.2 when heated to a still higher temperature will contract and thereby counteract the tendency of the particles of fused magnesium oxide to slightly expand when heated to a high temperature. Calcined magnesium oxide may be added in amounts up to as high as 20% by weight of the whole depending upon the size and shape of the article which is to be formed. For most purposes, I prefer to add about 10 to 15 per cent by weight of the calcined magnesia. When using about 75 to 85 parts of fused magnesia, and about 20 to 10 parts of calcined magnesia, about 5 to 15 parts of carbonizable binder should be added. When a magnesium compound is used as a binder enough water is added to give the mixture sufficient binding power and it is then rammed into position as a furnace lining, pressed up as a brick or crucible, or shaped in any desired manner.

The shaped article is allowed to dry, say for about 36 hours. It is then heated up slowly to a temperature so high that magnesium sulphate, or equivalent magnesium compound when used as a binder will decompose and the crystalline or prefused magnesium oxide particles may be consolidated with the residue of the magnesium oxide of the binder and with the calcined magnesium oxide to form a solid, homogeneous, monolithic mass. When tar has been used as a binder, residual carbon remains in the mass. At the surface the carbon burns out but the magnesia sublimes at the same time that the carbon is burned out. The vapor of the subliming magnesia condenses in the intercrystalline spaces. The result is a monolithic mass with a smooth adamantine surface although one would expect that the burning out of the carbon would leave the crystals without a binder. The final temperature should be 1700 to 1800 degrees C or higher. The residues remaining from the decomposition of the binders above enumerated, that is, for example, magnesium oxide and carbon, remain cohesive and non-fluxing up to the maximum firing temperature. In the case of a furnace lining, one of the most convenient ways to fire the lining is to heat up the furnace with a suitable charge to the desired temperature. In the case of a furnace lining, it is not always necessary that the entire lining from the inside to the outside wall be converted into a homogeneous mass. The outer portions may without detriment remain in a sintered loosely coherent state.

A furnace lining made as above described in accordance with my invention may be used without appreciable softening at the highest temperatures used in electric steel furnaces and at these high temperatures the surface layer is converted to a sub-vitreous or admantine condition which is so hard as to have a metallic ring at furnace operating temperatures, has a mass density of about 3.5 to 3.6, is strongly resistant to the chemical action of slags even at the highest temperatures and is strong mechanically at high temperatures. It does not materially expand or contract at temperatures up to 1800° C. A lining embodying my invention may be used for an almost indeterminate number of furnace runs without cracking or other deterioration, and when permitted to stand at ordinary temperatures will exhibit no tendency to absorb water or carbon dioxide from the atmosphere.

What I claim as new and desire to secure by Letters Patent of the United States, is,—

1. A refractory composition consisting in part of a coherent mixture of crystallized magnesia, calcined magnesia of lower density and carbon, and in part of a sub-vitreous monolithic layer of magnesia particles bound together by sublimed magnesia, said layer having a mass density of about 3.5 to 3.6, being so hard as to have a metallic ring at electric furnace operating temperatures and neither expanding nor contracting materially at temperatures up to 1800° C.

2. A furnace lining consisting substantially of crystallized and calcined magnesia, an outer layer of said lining containing a binder and an inner layer being devoid of binder and being mechanically strong, in a sub-vitreous condition, and so hard at furnace operating temperatures as to have a metallic ring.

3. The process of preparing a furnace refractory which consists in shaping into desired form a mixture comprising crystallized magnesia, calcined magnesia, and a binder which is decomposable at high temperatures to yield a cohesive, non-fluxing residue and heating to a temperature so high and under such conditions that in one part at least of the molded mass the binder is eliminated and the mass is converted by the sublimation and consolidation of magnesia into a hard sub-vitreous, monolithic mass.

4. The process of preparing a furnace refractory which consists in shaping into desired form a mixture of crystallized magnesia, calcined magnesia, and a carbonaceous binder, and heating the product to about 1700 to 1800° C., under conditions permitting elimination from a surface layer of the carbon residue resulting from decomposition of the binder, the mass thereby being converted into a sub-vitreous or adamantine condition by condensation of sublimed magnesia in intercrystalline spaces.

In witness whereof, I have hereunto set my hand this 12th day of July, 1921.

CHARLES A. SCHARSCHU.